United States Patent
Matsumura

(10) Patent No.: US 9,554,016 B2
(45) Date of Patent: Jan. 24, 2017

(54) SYSTEM, AND METHOD FOR CONTROLLING THE SYSTEM

(71) Applicant: CANON KABUSHIKI KAISHA, Tokyo (JP)

(72) Inventor: Takeshi Matsumura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/614,091

(22) Filed: Feb. 4, 2015

(65) Prior Publication Data

US 2015/0229808 A1 Aug. 13, 2015

(30) Foreign Application Priority Data

Feb. 7, 2014 (JP) ................................ 2014-022027

(51) Int. Cl.
*H04N 1/00* (2006.01)
*H04N 1/32* (2006.01)
*H04N 1/44* (2006.01)

(52) U.S. Cl.
CPC .......... *H04N 1/442* (2013.01); *H04N 1/00251* (2013.01); *H04N 1/32106* (2013.01); *H04N 1/32496* (2013.01); *H04N 1/4433* (2013.01)

(58) Field of Classification Search
None
See application file for complete search history.

(56) References Cited

U.S. PATENT DOCUMENTS

| | | | |
|---|---|---|---|
| 2006/0066891 A1* | 3/2006 | Ikeda et al. | 358/1.15 |
| 2006/0092455 A1* | 5/2006 | Maeda et al. | 358/1.15 |
| 2008/0010079 A1* | 1/2008 | Genda | 705/1 |
| 2009/0091775 A1* | 4/2009 | Yoshida | 358/1.13 |
| 2009/0148006 A1* | 6/2009 | Hayasaki | G06K 9/00221 382/118 |
| 2014/0173715 A1* | 6/2014 | Yano | 726/16 |

FOREIGN PATENT DOCUMENTS

| | | | | |
|---|---|---|---|---|
| JP | 2002-111926 | * | 4/2002 | H04N 1/00 |
| JP | 2009104599 A | | 5/2009 | |

* cited by examiner

*Primary Examiner* — Beniyam Menberu
(74) *Attorney, Agent, or Firm* — Canon U.S.A., Inc. IP Division

(57) ABSTRACT

An image forming apparatus, which forms an image on paper and is connected to be communicable with an image capturing apparatus that captures a person existing around the image forming apparatus, includes a receiving unit configured to receive a job, a generation unit configured to generate information representing a user who has input the job received by the receiving unit, and a transmission unit configured to transmit the information representing the user, which has been generated by the generation unit, to the image capturing apparatus.

18 Claims, 10 Drawing Sheets

FIG. 3A

| ID | JOB INPUT TIME | USER NAME | JOB CONTENT | STATUS CONTENT |
|---|---|---|---|---|
| 00000001 | 2013.05.23.09.37.672 | 048723 | PRINT | PRINT WAITING |
| 00000002 | 2013.05.23.09.44.318 | 029441 | UI OPERATION | UI OPERATION |
| 00000003 | 2013.05.23.10.05.854 | 007298 | PRINT | OUTPUT-COMPLETED |

FIG. 3B

| JOB CONTENT | STATUS CONTENT | |
|---|---|---|
| PRINT | USER TRACKING | 607 |
| | PRINT WAITING | 608 |
| | PRINT-IN-PROGRESS | 609 |
| | OUTPUT-COMPLETED | 610 |
| | END | 611 |
| UI OPERATION | AUTHENTICATION-IN-PROGRESS | 612 |
| | AUTHENTICATION-COMPLETED | 613 |
| | END | |

FIG. 3C

| JOB CONTENT | STATUS CONTENT | SPECIFYING MODE | |
|---|---|---|---|
| PRINT | USER TRACKING | USER TRACKING | ~614 |
| | PRINT WAITING | USER DETECTION | ~615 |
| | PRINT-IN-PROGRESS | USER DETECTION | |
| | OUTPUT-COMPLETED | USER DETECTION | |
| | END | END | ~616 |
| UI OPERATION | AUTHENTICATION-IN-PROGRESS | USER AUTHENTICATION | ~617 |
| | AUTHENTICATION-COMPLETED | END | ~618 |
| | END | END | |

SYSTEM, AND METHOD FOR CONTROLLING THE SYSTEM

BACKGROUND OF THE INVENTION

Field of the Invention

The present invention relates to a system and a method for controlling the system.

Description of the Related Art

In recent years, installation of a network camera in a store and an office building in addition to installation thereof on a street and a road has spread (see Japanese Patent Application Laid-Open No. 2009-104599). In addition to a conventional purpose of monitoring in the network camera, high resolution of a video, which can be acquired by the network camera, enables personal identification and enables an inappropriate action in a commercial facility or an office to be specified and prevented. Further in the future, not only the monitoring but also an application to marketing such as specifying of a person from the video acquired by the network camera and development of a new service for a person specified in the commercial facility or the office has already started.

On the other hand, in a face authentication technique using the network camera, authentication speed is high. However, authentication accuracy is low if a degree of similarity is a predetermined threshold value or more. For example, a person is identified with another person.

Particularly if the video is searched for an unspecified large number of persons, the authentication accuracy further decreases. The authentication accuracy also depends on an amount of data at an authentication source of a database for performing face authentication. As the number of persons registered in the database increases, an error rate further increases and the number of times of false recognition increases.

SUMMARY OF THE INVENTION

The present invention is directed to providing a mechanism capable of limiting, when information about a user to be captured is collated with feature information about a registered user, a user candidate to be collated to efficiently complete collation processing and improve collation accuracy.

According to an aspect of the present invention, a system includes an image forming apparatus that forms an image on paper and an image capturing apparatus that captures a person existing around the image forming apparatus, wherein the image forming apparatus includes a receiving unit configured to receive a job, a generation unit configured to generate information representing a user who has input the job received by the receiving unit, and a transmission unit configured to transmit the information representing the user, which has been generated by the generation unit, to the image capturing apparatus, and the image capturing apparatus includes an image capturing unit configured to capture the person existing around the image forming apparatus, a specifying unit configured to specify, from a storage unit configured to store feature information about a plurality of users, a user to be compared with feature information about the person captured by the image capturing unit based on the information representing the user that has been transmitted by the transmission unit, and a notification unit configured to, by comparing the feature information about the user specified by the specifying unit with the feature information about the person captured by the image capturing unit, notify the image forming apparatus of a comparison result.

Further features of the present invention will become apparent from the following description of exemplary embodiments with reference to the attached drawings.

BRIEF DESCRIPTION OF THE DRAWINGS

FIGS. 3A, 3B, and 3C illustrate an example of a job management table.

DESCRIPTION OF THE EMBODIMENTS

Various exemplary embodiments, features and aspects of the present invention will be described in detail below with reference to the drawings.

<Description of System Configuration>

Figure 1:
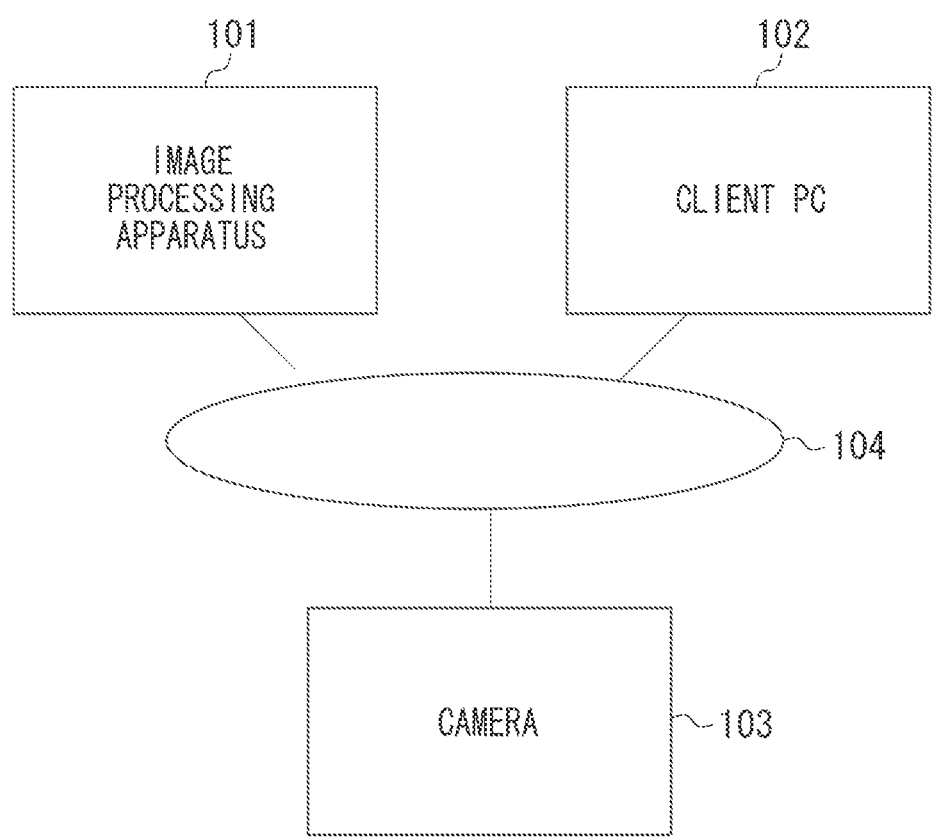
FIG. 1 is a block diagram illustrating a configuration of an image processing system.

FIG. 1 is a block diagram illustrating a configuration of an image processing system according to a first exemplary embodiment.

In FIG. 1, an image processing apparatus 101 includes hardware including a central processing unit (CPU), a read-only memory (ROM), and a random access memory (RAM) and software for implementing image editing and functional processing such as printing, facsimile, and copying. Further, the image processing apparatus 101 includes a network (interface) controller (NIC), and is communicable with an apparatus connected to a network 104 using a predetermined protocol.

The image processing apparatus 101 generates, when a user inputs a job to the image processing apparatus 101, a content of the job and a list table including the user, and notifies a camera 103 of the job content and the list table via the network 104, described below. Control is performed to display a message and an image on a user interface (UI) based on a face authentication result sent from the camera 103 via the network 104. The camera 103 can capture a space in close proximity to the image processing apparatus 101. More specifically, the camera 103 can capture the space in a wide range by driving a lens position of the camera 103 using a driving unit. The camera 103 includes a zoom mechanism, and can capture a face serving as feature information about the user who approaches the image processing apparatus 101.

A client personal computer (PC) 102 functioning as an information processing apparatus includes a CPU, a ROM, a RAM, a network controller, a hard disk, and an input/output device (a display device, and an input device) as general hardware resources. The user inputs the job to the image processing apparatus 101 via a device driver under management of an operation system (OS) in the client PC 102. The image processing apparatus 101 is communicable with the camera 103 via the network 104 and notifies, when the job is input from the client PC 102, the camera 103 of an identifier (ID) of the client PC 102 from which the job has been input. The client PC 102 may be of any type such as a tablet terminal or a smartphone if it can input a job to the image processing apparatus 101.

The camera 103 functions as a so-called network camera, and includes hardware and software resources for segmenting, recording, and analyzing a specific area from a captured image. The camera 103 may be installed at any position within a room where the image processing apparatus 101 is installed if it can capture a desired area or the image processing apparatus. The camera 103 includes a charge coupled device (CCD) image capturing apparatus that executes an imaging function, an image processing function, a communication function, and authentication processing, a reduced instruction set computer (RISC) that performs image processing, and a CPU, a ROM, and a RAM that perform data processing. Further, the camera 103 includes hardware resources including a network controller that performs a communication function, a data storage unit, and a storage unit for storing a control program.

A recording server for storing a video captured by the camera 103, a management sever for controlling the camera 103, an authentication server for performing face authentication, and a position server for managing a position of each client PC may exist. However, in the present exemplary embodiment, the camera 103 includes these functions, and performs corresponding processing.

In the present exemplary embodiment, the camera 103 specifies a person set in the list table transmitted from the image processing apparatus 101 upon receiving a request from the image processing apparatus 101, and transmits information about the specified person to the image processing apparatus 101. All the image processing apparatus 101, the client PC 102, and the camera 103 are connected to the network 104 such as Ethernet®.

Figure 2:
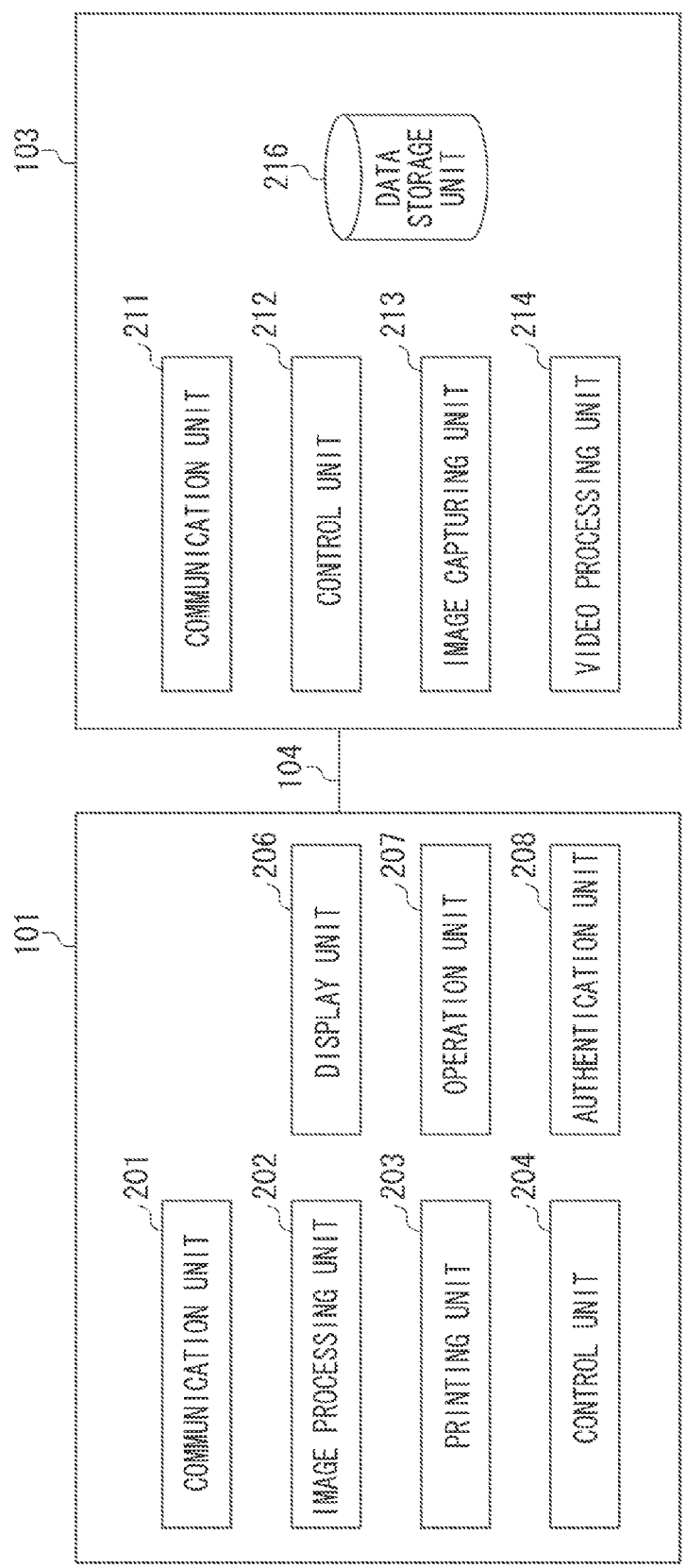
FIG. 2 illustrates an example of configurations of an image processing apparatus and a camera.

FIG. 2 is a block diagram illustrating functional processing of the image processing apparatus 101 and the camera 103 illustrated in FIG. 1. A control unit 204 and a control unit 212 perform a program (a module) stored in the ROM or the hard disk to integrally control the units. In particular, each of the CPUs included in the image processing apparatus 101 and the camera 103 may execute software.

In FIG. 2, a communication unit 201 in the image processing apparatus 101 receives an input of a job from the client PC 102 via the network 104. A print instruction is taken as an example. The job (including print data and print setting information) to be printed is transmitted to the image processing apparatus 101 from the client PC 102. The client PC 102 also simultaneously transmits a name of a user who has performed the printing. The communication unit 201 starts an exchange with the camera 103 to control communication with another apparatus. An image processing unit 202 subjects the job received by the communication unit 201 to rendering processing or ripping processing, and converts the job into a printable format. The control unit 204 retains image data obtained by the conversion by the image processing unit 202 in the RAM (not illustrated), and outputs the retained image data to a printing unit 203 while being synchronized with an engine. The printing unit 203 prints the image data obtained by the conversion on paper, and discharges the paper. A system to be used by the printing unit 203 may be either an electrophotographic system or an inkjet system.

The control unit 204 integrally controls the units in the image processing apparatus 101. The control unit 204 includes a CPU, a ROM, and a RAM. In the present exemplary embodiment, the control unit 204 has a function of generating and updating the list table if a job is input into the image processing apparatus 101, if face authentication is required when a UI operation is performed, or at a timing when a status of the job has changed.

FIGS. 3A to 3C illustrate an example of a job management table generated by the control unit 204 in the image processing apparatus 101 illustrated in FIG. 2. FIG. 3A will be described below.

In FIG. 3A, "ID" 601 represents IDs of a job, which are assigned values in the order added to the job management table. "Job input time" 602 represents the time when the job was input. "User name" 603 represents a name of a user who input the job from the client PC 102 or a user who operates the UI in the image processing apparatus 101. The user who operates the UI in the image processing apparatus 101 is identified using an authentication unit 208, described below.

"Job content" 604 represents a name of the job input from the client PC 102 or a content of a UI operation of the image processing apparatus 101 by the user. "Status content (a job status)" 605 indicates what status each job content is in. In the present exemplary embodiment, the "ID" 601, the "job input time" 602, the "user name" 603, the "job content" 604, and the "status content" 605 illustrated in FIG. 3A are generically named job information. The job includes a print job, and also includes the user operating an operation unit in the image processing apparatus 101. The job information is generated by the control unit 204 in the image processing apparatus 101 upon receiving the job, and is managed on a memory (not illustrated).

In the present exemplary embodiment, control is performed to dynamically change a content of the job information to be transmitted to the camera 103 depending on a change in a processing status of the job in the image processing apparatus 101. A user collation mode is automatically switched depending on the status of the job in the image processing apparatus 101 when viewed from the camera 103. More specifically, in the image processing apparatus 101, job information for specifying a user who may be collated for a job to be managed is generated to be switched depending on the status of the job.

A specifying mode and collation switching processing by the camera 103 in the present exemplary embodiment will be described below with reference to FIG. 3C.

In FIG. 3C, in the present exemplary embodiment, "specifying mode" 606 includes three types of specifying modes, i.e., "user tracking" 614, "user detection" 615, and "user authentication" 617. The "user tracking" 614 is a mode in which a job content is a print job and which is set for a user who comes to issue a printing instruction and to pick up a printing result. When the "specifying mode" 606 is the "user tracking" 614, the number of users who have requested a job is one. Thus, the number of user information to be collated is and the number of features to be collated and the number of feature information (face images of the user previously registered) for which user information about a job is searched are also "1", respectively.

Similarly, if the "specifying mode" 606 is the "user authentication" 617, the number of users who operate an operation unit 207 is "1". Thus, the number of features to be collated and the number of feature information (face images of the user previously registered) for which user information about a job is searched are also respectively.

On the other hand, if the "specifying mode" 606 is the "user detection" 615, the "status content" 605 is further divided into "print waiting", "print-in-progress", and "output-completed". The "print waiting" is a state where a plurality of jobs is spooled, a state where the jobs are waited for to be output in the received order, and a state where a plurality of users is involved in the output. The "output-completed" is a state where the jobs have already been output but the user who has issued an instruction to output the jobs has not yet come to pick up the output jobs.

If the "specifying mode" 606 is the "user detection" 615, a plurality of users is listed in the job management table (FIG. 3A).

Therefore, the camera 103 switches collation processing in a manner described below according to the "specifying mode" 606 when user collation processing using list data in the job management table generated by the image processing apparatus 101 is performed. Thus, the collation processing is efficiently completed in a short time so that authentication accuracy can be improved.

Referring to FIG. 2 again, a display unit 206 displays information received from the camera 103 via the network 104 on the image processing apparatus 101. The display unit 206 includes a physical display device including a liquid crystal panel.

The operation unit 207 receives an operation for the image processing apparatus 101. The user issues a request to the camera 103 via the operation unit 207. The operation unit 207 also includes a physical keyboard or a numeric keypad. If the display unit 206 is a touch panel, the operation unit 207 controls information input from the display unit 206.

The authentication unit 208 is used to specify a user who attempts to use the image processing apparatus 101, and to examine authority given to the user to verify whether the image processing apparatus 101 can be used. The authentication unit 208 may cause a person who attempts to operate the image processing apparatus 101 to input a user name and a password via the operation unit 207, or may use an ID card. If a user who has performed printing using the client PC 102 and a user who uses the image processing apparatus 101 are the same person, a user name in the authentication unit 208 and a user name received by the communication unit 201 match each other.

In the present exemplary embodiment, it is determined using a face authentication result from the camera 103, as needed, whether the users are the same person. A communication unit 211 in the camera 103 starts an exchange with the image processing apparatus 101 via the network 104 to control communication with another apparatus.

The control unit 212 in the camera 103 integrally controls the units in the camera 103. The control unit 212 includes a CPU, a ROM, and a RAM. In the present exemplary embodiment, the control unit 212 extracts a specified person from image data captured by an image capturing unit 213 or image data stored in a data storage unit 216. Details of face authentication processing performed by the control unit 212 will be described below. When the control unit 212 specifies a person in a video, the column information 601, 602, 603, 604, and 605 about an ID including a user name of the specified person is extracted from a management table illustrated in FIG. 3, and is transmitted to the image processing apparatus 101 as a specifying result by the communication unit 211.

The image capturing unit 213 performs image capturing using an image sensor such as a CCD, and stores image data obtained by the image capturing in the data storage unit 216. In the present exemplary embodiment, the camera 103 continues to capture a predetermined area including the image processing apparatus 101 for 24 hours.

A video processing unit 214 segments video information stored in the data storage unit 216, searches for a target of the video information, and converts the video information into a still image. The stored video information is feature information about an unspecified large number of users who have previously been registered as using the image processing apparatus 101, and is image information to be collated with face information about a user to be captured by the camera 103.

In the present exemplary embodiment, the video information is segmented to obtain video information in a designated period, the obtained video information is searched for a person in the vicinity of the image processing apparatus 101, and the person (a user candidate) is specified. Consequently, the column information 601, 602, 603, 604, and 605 about an ID including a user name of the specified person is extracted from the list table, and the list table is transmitted as a specifying result to the image processing apparatus 101.

The communication unit 211 receives the list table generated by the control unit 204. The control unit 212 analyzes the list table received by the communication unit 211.

More specifically, the control unit 212 specifies a person with the "user name" 603 in the list table depending on situations of the "job content" 604 and the "status content" 605. A specific period to be a target is a period during which an ID of the specified person still remains in the list table. The data storage unit 216 is a data storage cabinet, and receives data processed by the image capturing unit 213, the video processing unit 214, and the control unit 212 and stores the received data. Any storage medium may be used.

Figure 4:
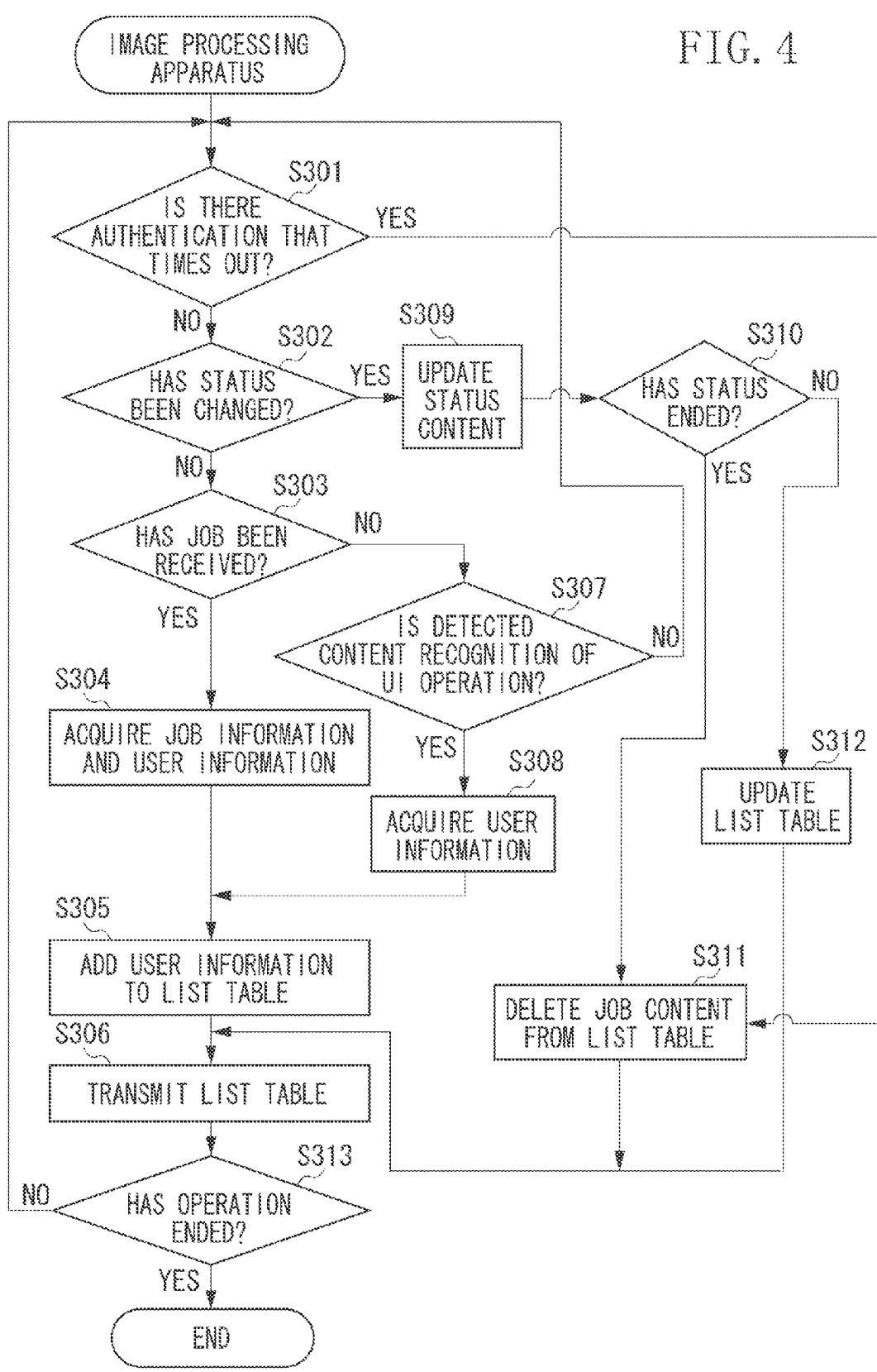
FIG. 4 is a flowchart illustrating a method for controlling the image processing apparatus.

FIG. 4 is a flowchart illustrating a method for controlling the image processing apparatus 101 according to the present exemplary embodiment. This example describes processing in the image processing apparatus 101 performed when printing is performed from the client PC 102 to the image processing apparatus 101 or a user operates the image processing apparatus 101 from the operation unit 207 in the image processing apparatus 101. In each of steps in the flowchart illustrated in FIG. 4 and the subsequent flowcharts, the CPU included in the control unit 204 executes a program read out of the ROM or the hard disk drive (HDD) by each of processing units, and stores a processing result or data in the RAM, the ROM, or the HDD, to transfer the data among the processing units. The communication unit 201 serving as a network interface card transmits and receives the data to and from each of the apparatuses.

In step S301, the control unit 204 in the image processing apparatus 101 determines whether there is authentication that times out in processing for specifying a person using face authentication that has started on the side of the camera 103 based on a list table. It is determined that authentication has timed out when a defined period of time has elapsed for each job content from a job input time in a generated list table is input.

If the control unit 204 determines that no authentication has timed out (NO in step S301), then in step S302, the control unit 204 determines whether a status has been changed in a job managed in the list table. The status is defined for each job, and its example is illustrated in FIG. 3B. As illustrated in FIG. 3B, the "status content" 605 is defined for the "job content" 604.

If the control unit 204 determines that the status has not changed (NO in step S302), the processing proceeds to step S303. In step S303, the control unit 204 determines whether a job has been received from the client PC 102 in the communication unit 201. If the control unit 204 determines that the job has been received (YES in step S303), then in step S304, the control unit 204 acquires job information and user information sent together with the job information. In step S305, the control unit 204 adds, to the list table illustrated in FIG. 3A, the acquired user information, together with a job input time and status information.

If the addition to the list table ends, then in step S306, the control unit 204 transmits the list table to the camera 103 from the communication unit 201. Processing performed when the camera 103 receives the list table will be described below.

On the other hand, if the control unit 204 determines that the job has not been received (NO in step S303), then in step S307, the control unit 204 determines whether the detected content is recognition of a UI operation (a user authentication mode) provided by the operation unit 207. If the control unit 204 determines that the detected content is not the recognition of the UI operation (NO in step S307), there is no detection content, and thus the processing returns to step S301. In the present exemplary embodiment, in the user authentication mode or a job addition mode, a user to be collated is specified. Thus, the number of users included in the job information to be transmitted to the camera 103 by the image processing apparatus 101 is singular. Thus, in the camera 103, the number of feature information about many users stored in the data storage unit 216 and the number of registered image information to be collated with a face image of a captured user are respectively reduced. Therefore, authentication accuracy is improved while collation processing can be efficiently completed in a short time. Thus, in the present exemplary embodiment, control is performed to dynamically switch a collation mode by the camera 103 depending on the number of users included in job information for collation received from the image processing apparatus 101.

On the other hand, if the control unit 204 determines that the detected content is the recognition of the UI operation (YES in step S307), then in step S308, the control unit 204 acquires user information about a user who is performing the UI operation, and the processing proceeds to step S305.

For processing for determining whether the status has been changed in step S302, an example of the change in the status will be described with reference to FIG. 3B.

In FIG. 3B, immediately after a job in which the "job content" 604 thereof is "print", i.e., print from the client PC 102 to the image processing apparatus 101 has been transmitted, the "status content" 605 is "user tracking" 607.

When it is detected that a user who has input the job has approached the periphery of the image processing apparatus 101, the "status content" 605 shifts to "print waiting" 608. As a method for detecting that the user has approached the periphery of the image processing apparatus 101, the control unit 212 may specify a person from an image captured by the image capturing unit 213 in the camera 103, or the authentication unit 208 in the image processing apparatus 101 may authenticate the person.

The "print waiting" 608 need not necessarily shift to this status. The "print waiting" 608 may immediately shift to "print-in-progress" 609 at a timing of receiving of the job from the client PC 102.

When the user issues a printing instruction using the operation unit 207 in the image processing apparatus 101, the status content 605 shifts to the "print-in-progress" 609. When print processing in the printing unit 203 in the image processing apparatus 101 ends, the status content 605 shifts to "output-completed" 610.

When it is detected that the user has taken out paper, which has already been output, the "status content" 605 is "end" 611.

When the "job content" 604 is "UI operation" in FIG. 3B, i.e., the user operates the operation unit 207 in the image processing apparatus 101 and the authentication unit 208 specifies the user, face authentication is further performed using information about the user. The control unit 212 in the camera 103 performs the face authentication. The "status content" 605 is "authentication-in-progress" 612 when the authentication is being performed. In a situation where the authentication normally ends or the face authentication cannot be performed, if the authentication is completed using another authentication method, the "status content" 605 shifts to "authentication-completed" 613. When it is detected that the user has moved away from the image processing apparatus 101, the "status content" 605 shifts to "end".

Referring to FIG. 4 again, if the control unit 204 determines that the status has been changed by shifting the "status content" 605 (YES in step S302), then in step S309, the control unit 204 updates the "status content" 605. In step S310, the control unit 204 then determines whether the status ends by updating of the "status content" 605. If the control unit 204 determines that the status has ended by updating the "status content" 605 (YES in step S310), then in step S311, the control unit 204 deletes the job content from the list table, and the processing proceeds to step S306.

On the other hand, if the control unit 204 determines that the status has not ended so that the "status content" 605 has been updated (NO in step S310), then in step S312, the control unit 204 updates the list table. In step S306, the control unit 204 transmits the updated list table. If the image processing apparatus 101 performs an operation for shutting off the power thereto in step S313, the operation ends.

Figure 5:
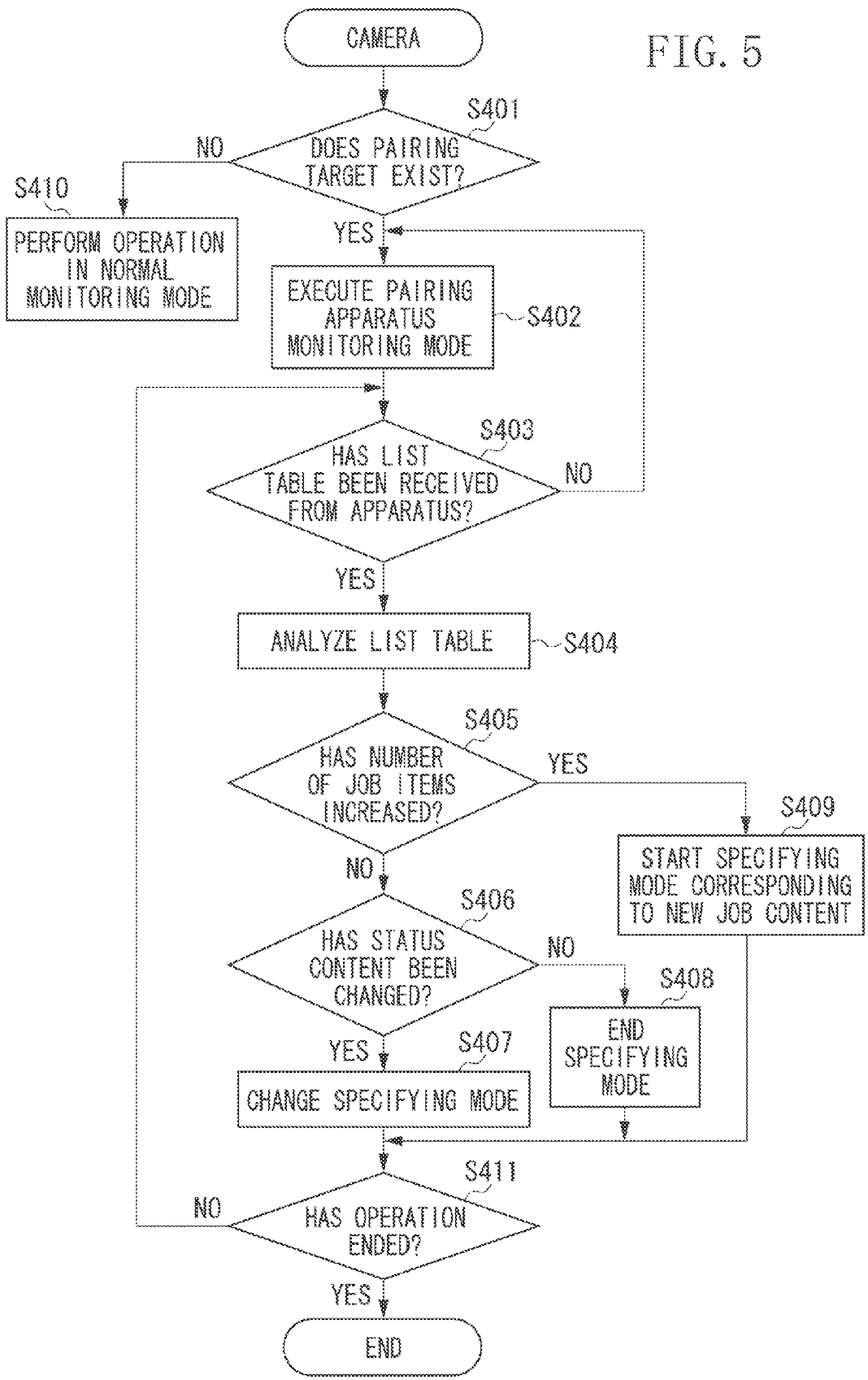
FIG. 5 is a flowchart illustrating a method for controlling an image capturing apparatus.

FIG. 5 is a flowchart illustrating a method for controlling an image capturing apparatus according to the present exemplary embodiment. This example describes processing performed when a list table is transmitted from the image processing apparatus 101 to the camera 103 serving as the image capturing apparatus, and the camera 103 specifies a person based on a content of the received list table. Each of the steps is implemented when the control unit 212 or a CPU included in the communication unit 211 in the camera 103 executes a control program.

In step S401, the control unit 212 in the camera 103 determines whether an image processing apparatus to be paired with the image processing apparatus 101 serving as a transmission source of the list table exists when specifying a person. If the control unit 212 determines that the image processing apparatus serving as a paring target does not exist (NO in step S401), then in step S410, the control unit 212 performs an operation in a normal monitoring mode previously set.

On the other hand, if the control unit 212 determines that the image processing apparatus serving as a pairing target exists (YES in step S401), the processing proceeds to step S402. In step S402, the control unit 212 executes a pairing apparatus monitoring mode in which a specified person is detected while communicating with the image processing apparatus serving as the pairing target via the network 104.

In the pairing apparatus monitoring mode, in step S403, the control unit 212 determines whether the communication unit 211 has received the list table from the image processing apparatus 101 via the network 104. If the control unit 212 determines that the communication unit 211 has not received the list table (NO in step S403), a state of an operation, which has been performed until the list table was received from the image processing apparatus 101, is maintained.

On the other hand, if the control unit 212 determines that the communication unit 211 has received the list table (YES in step S403), then in step S404, the communication unit 211 stores the data in the data storage unit 216 while starting to analyze the list table.

In step S405, the control unit 212 first confirms whether the number of job items within the list table has become larger than that in the previous time in the analysis of the list table in step S404. If the control unit 212 determines that the number of job items has increased (YES in step S405), then in step S409, the control unit 212 starts to perform an operation in a specifying mode determined by the "job content" 604 and the "status content" 605 serving as the items.

An example of the "specifying mode" 606 corresponding to the "job content" 604 and the "status content" 605 is the "user detection" 615 illustrated in FIG. 3C.

The "user tracking (a user tracking mode)" 614 is a mode in which the control unit 212 specifies a user, who has input a job to the image processing apparatus 101 from the client PC 102, from a video around the image processing apparatus 101 in the image capturing unit 213 in the camera 103, for example. Thus, a movement situation of a user who has requested the job is monitored. If the user is within a predetermined distance from the image processing apparatus 101, the column information 601, 602, 603, 604, and 605 about an ID including a user name of the specified user is extracted. The communication unit 211 notifies the image processing apparatus 101 of the column information as a specifying result. The image processing apparatus 101, which has received the notification, may detect that the user is within the predetermined distance therefrom, and may cause the printing unit 203 to start to perform print processing.

The "user detection" 615 is a mode in which in the camera 103, for example, the control unit 212 acquires a list of user names included in IDs in which the "specifying mode" 606 is the "user detection" 615, and determines whether persons serving as the users with the user names exist in a specific area within a video captured using the image capturing unit 213. If the person is specified, information about the person is transmitted to the client PC 102. The specific area may be previously determined, or may be within a predetermined distance from the image processing apparatus 101, as described above.

Thus, face authentication accuracy is improved by specifying only a person described in the list table transmitted from the client PC 102 rather than specifying an unspecified large number of persons from within a video in a conventional technique.

The "user authentication (a user authentication mode)" 617 is normal one-to-one face authentication. More specifically, in the camera 103, the control unit 212 acquires a user name included in an ID in which the "specifying mode" 606 is the "user authentication" 617, and determines whether a user with the user name is the same as a person around the image processing apparatus 101 within a video captured using the image capturing unit 213. The camera 103 notifies the image processing apparatus 101 of a determination result.

Referring to FIG. 5 again, if the control unit 212 determines that the number of job items has not increased (NO in step S405), then in step S406, the control unit 212 determines whether the "status content" 605 has been changed from the list table transmitted last time for each ID in the list table. If the control unit 212 determines that the status content 605 has been changed (YES in step S406), then in step S407, the control unit 212 changes the "specifying mode" 606 to a specifying mode corresponding to the changed "status content" 605. More specifically, the "specifying mode" 606, which has so far been performed for the ID corresponding to the changed "status content" 605, ends once, and the camera 103 starts the "specifying mode" 606 corresponding to the new "status content" 605.

On the other hand, if the control unit 212 determines that the "status content" 605 has not been changed (NO in step S406), the list table is transmitted from the image processing apparatus 101 in a state where the ID in the list table has not increased and the status has not been changed. This means that any ID in the list table has ended and has been deleted from the list table.

In step S408, the control unit 212 deduces the deleted ID, and ends the "specifying mode" 606 corresponding to the ID. In step S411, such processing is repeated until the end of an operation such as power-off of the camera 103 is detected, and ends when the end of the operation is detected.

Figure 6:
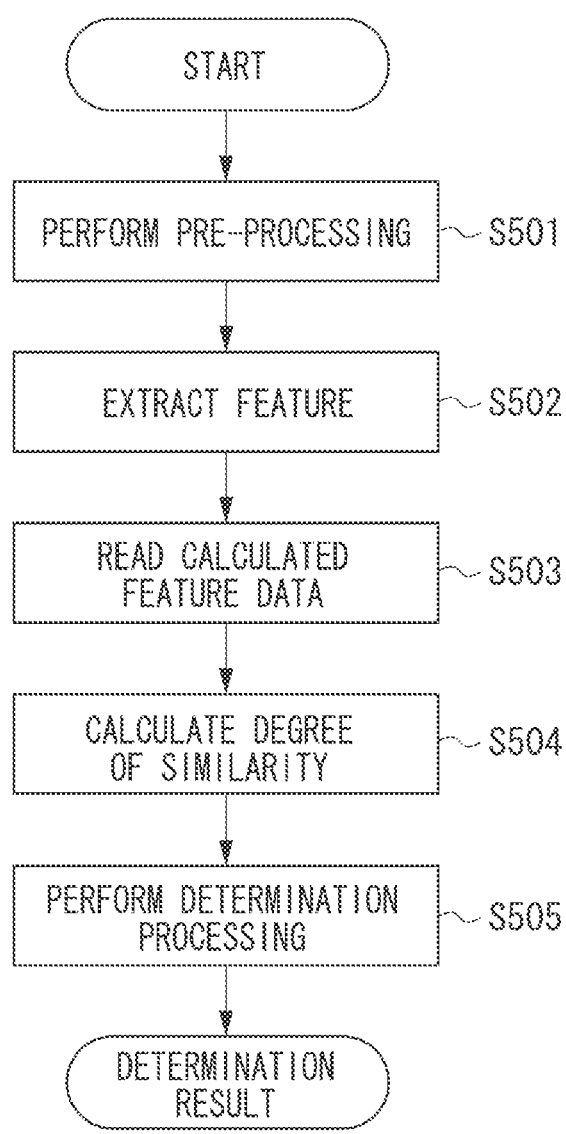
FIG. 6 is a flowchart illustrating a method for controlling the image capturing apparatus.

FIG. 6 is a flowchart illustrating a method for controlling the image capturing apparatus according to the present exemplary embodiment. This example describes processing of the camera 103 performed when an individual is specified using face authentication. Each of steps is implemented when the control unit 212 or the video processing unit 214 in the camera 103 executes a control program.

In step S501, the video processing unit 214 subjects a video captured by the camera 103 to pre-processing required for the face authentication. In the pre-processing, the image capturing unit 213 inputs and stores an image including an object, a person, or its part whose feature used for authentication is to be extracted. In the present exemplary embodiment, an image including a head of the person is input and stored as the image.

In step S502, the video processing unit 214 then extracts a feature to perform the face authentication. The video processing unit 214 extracts an area including a feature point used for the authentication from new image data to be input, to normalize a size, a position of the feature point, and a concentration distribution. If the image data includes a face, for example, the feature point is a point that most characterizes the person, e.g., eyes, a nose, or a mouth. In step S503, the video processing unit 214 reads, for data representing an image previously captured, feature data calculated at a feature extraction point of the image from the data storage unit 216.

"Feature" means data representing a result of calculating data representing a feature point for the above-mentioned image using predetermined calculation, e.g., convulsion calculation of a plurality of filters for data representing an image previously captured. In the first exemplary embodiment, features of all the filters are previously calculated for the captured image, feature calculation results are stored for all the filters, and all or some of the feature calculation results can be extracted.

In step S504, the video processing unit 214 performs similarity calculation processing. The video processing unit 214 compares a feature previously retained in the data storage unit 216 with a feature calculated by extracting the feature (step S502), to calculate a degree of similarity. In step S505, the video processing unit 214 then determines whether a target of an image input based on the degree of similarity calculated by the similarity calculation processing is the same as a target of a registered image. The video processing unit 214 determines, if the targets are persons, whether the persons are the same using the similarity calculation processing. A determination result is transferred from the camera 103 to the image processing apparatus 101.

As described above, according to the present exemplary embodiment, the camera 103 specifies a person using the face authentication based on the list table transmitted from the image processing apparatus 101 so that authentication speed and authentication accuracy can be improved.

Figure 7:
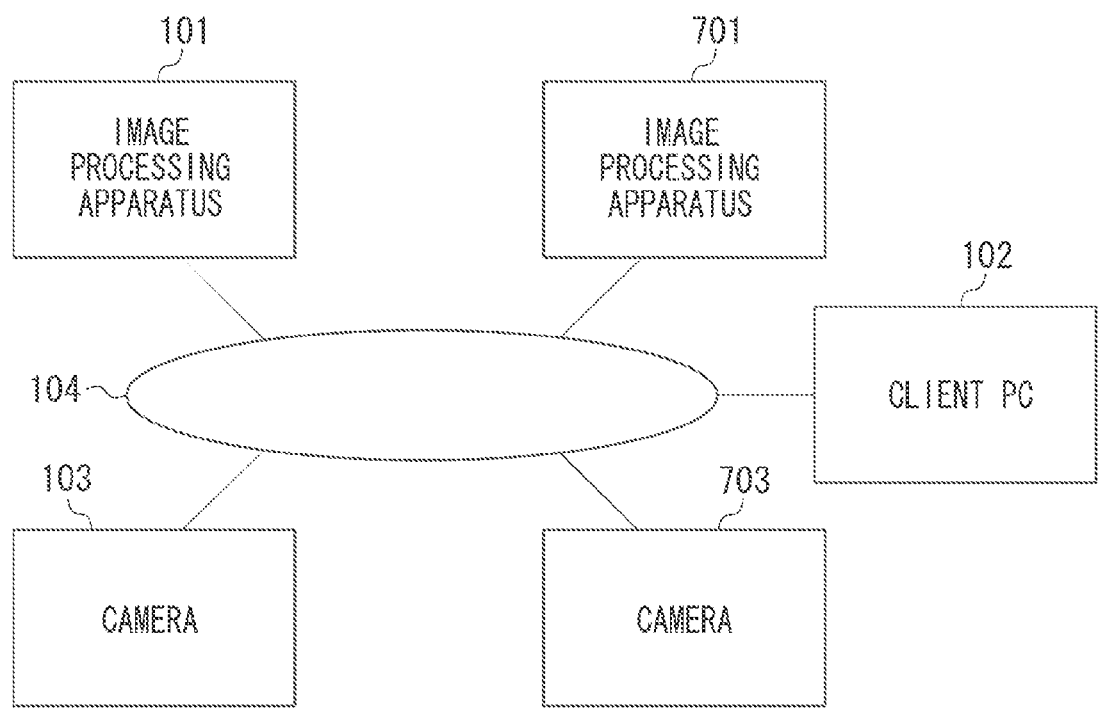
FIG. 7 is a block diagram illustrating a configuration of an image processing system.

FIG. 7 is a block diagram illustrating a configuration of an image processing system according to a second exemplary embodiment. This example describes a system in which a plurality of image processing apparatuses 101 exists and a plurality of cameras 103 exists. In this example, a plurality of image processing apparatuses 101 and 701 and a plurality of cameras 103 and 703 exist on the same network 104, as illustrated in FIG. 7, although a basic configuration is similar to that in the first exemplary embodiment. The camera 703 has a similar configuration to that of the camera 103, i.e., hardware illustrated in FIG. 2.

Figure 8:
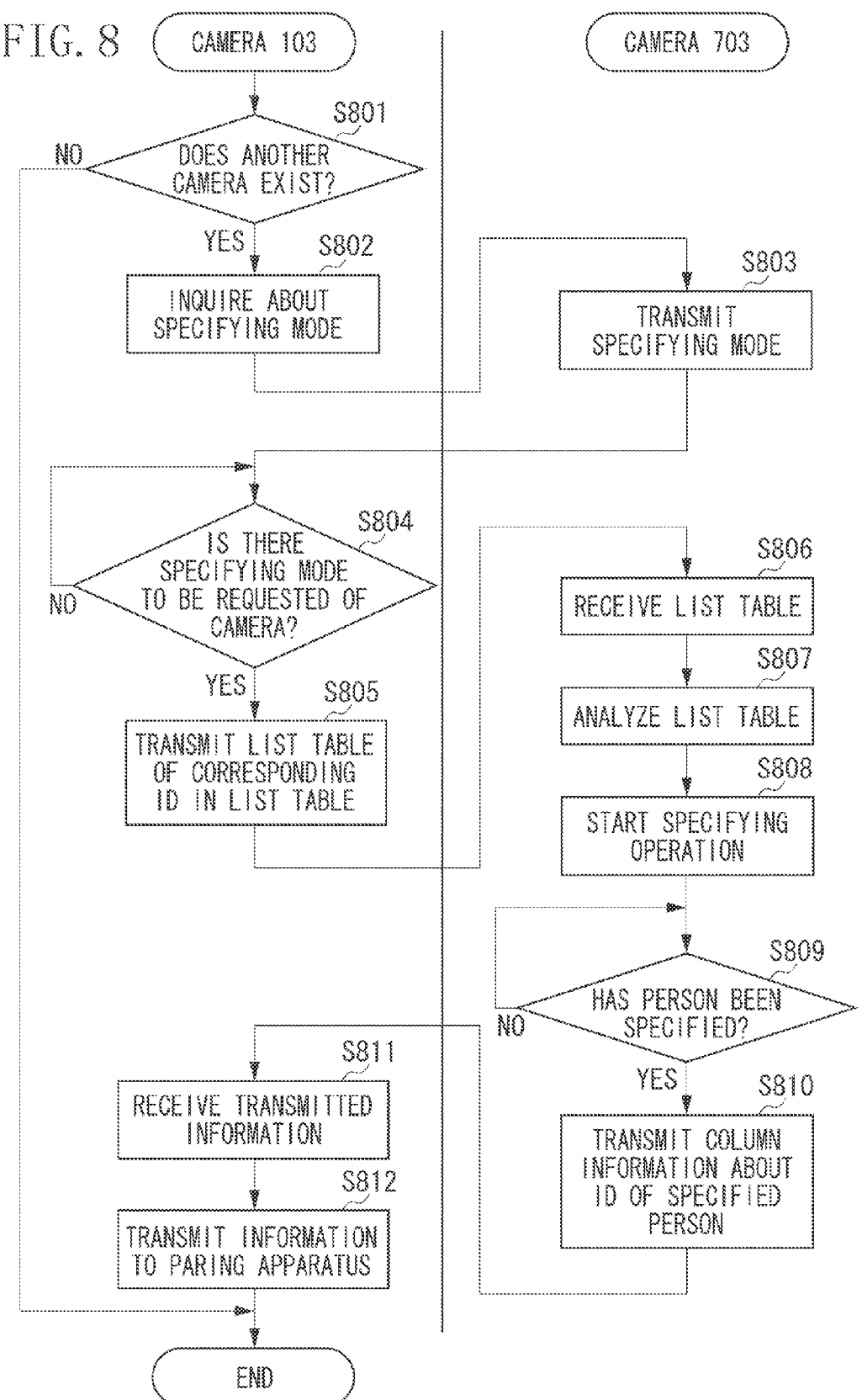
FIG. 8 is a flowchart illustrating a method for controlling the image processing system.

FIG. 8 is a flowchart illustrating a method for controlling the image processing system according to the second exemplary embodiment. This example describes processing in a case where the camera 103 and the image processing apparatus 101 are paired, and the camera 103 performs an operation for specifying a person according to a content of a list table transmitted from the image processing apparatus 101 in the configuration illustrated in FIG. 7.

In step S801, a control unit 212 in the camera 103, which has received the list table from the image processing apparatus 101, first determines whether another camera 703 exists on the same network 104. If the control unit 212 determines that the camera 703 does not exist (NO in step S801), the processing is not performed.

On the other hand, if the control unit 212 determines that the camera 703 exists on the same network 104 (YES in step S801), then in step S802, the control unit 212 inquires of the camera 703 "specifying mode" 606 included in the camera 703 from a communication unit 211 in the camera 103. In step S803, the camera 703, which has received the inquiry, transmits the "specifying mode" 606, which can be implemented by itself, to the camera 103.

In step S804, the control unit 212 in the camera 103, which has received the "specifying mode" 606, checks whether there is the "specifying mode" 606 to be also requested of the camera 703 from within the list table received from the image processing apparatus 101. This is a case where a person to be specified cannot be specified within a video captured by the camera 103 and the camera 703 has a function of specifying the person.

For example, in the present exemplary embodiment, "user tracking" 614 exists in the "specifying mode" 606 in the received list table. In this case, when a person with a user name included in its ID cannot be found out in the video captured by the image capturing unit 213 in the camera 103, if the camera 703 has a function of the "user tracking" 614, it is determined that there is a status that is requested to be specified. If there is no status that is requested to be specified or the camera 703 does not have the "specifying mode" 606 to be requested, communication is not performed.

If the control unit 212 determines that there is the "specifying mode" 606 to be requested of the camera 703 (YES in step S804), then in step S805, the camera 103 transmits a list table of a corresponding ID in the list table to the communication unit 211 in the camera 703.

If the camera 103 thus requests the camera 703 to specify a user, then in step S806, the camera 703 receives the list table. In step S807, the camera 703 analyzes the list table. In step S808, the camera 703 starts to perform a specifying operation corresponding to a content of the list table.

In step S809, a control unit 212 in the camera 703, which has started the specifying operation, determines whether a person corresponding to the list table has been specified. If the person has been specified (YES in step S809), then in step S810, the control unit 212 extracts column information 601, 602, 603, 604, and 605 about an ID including a user name of the specified person. In step S810, the communication unit 211 in the camera 703 transmits the extracted information together with a specific position, to the camera 103.

In step S811, the camera 103 receives the information transmitted from the camera 703. In step S812, the camera 103 transmits the information to a paring apparatus, as needed. As a content to be transmitted, information specific to the camera 703 may be text information together with a specified person. Alternatively, a video captured by the camera 703 may be separately received, and information about the video may be transmitted.

Figure 9:
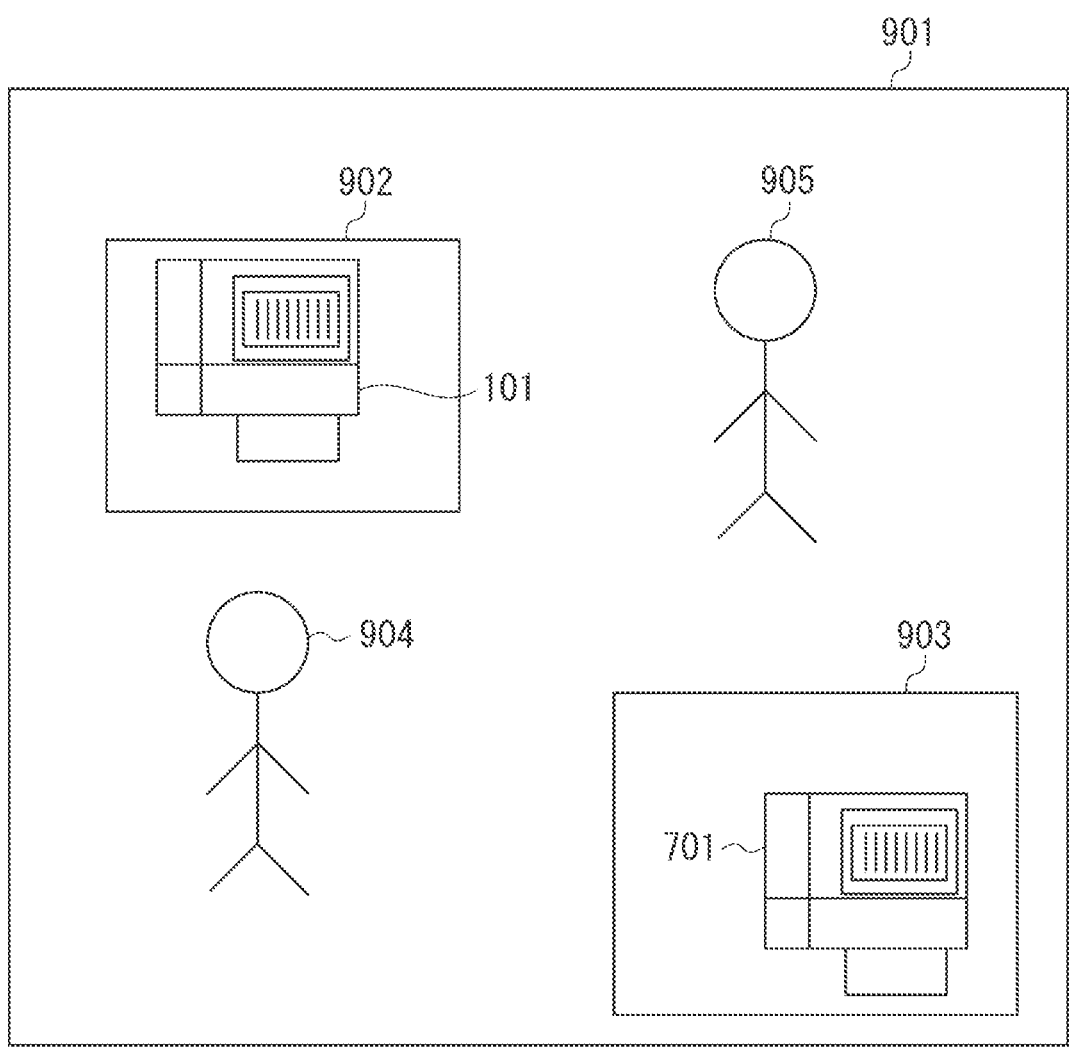
FIG. 9 illustrates an example of a captured video.

FIG. 9 illustrates an example of a video captured by an image capturing unit 213 in the camera 703, which receives a request to specify a user from the camera 103 in the image processing system illustrated in FIG. 7.

In FIG. 9, a video 901 captured by the camera 703 includes the image processing apparatuses 101 and 701 and users 904 and 905.

In this case, the camera 703 is paired with the image processing apparatus 101 and the image processing apparatus 701. The control unit 212 in the camera 703 executes a user detection mode, described below, when a plurality of specifying modes is operable within one video. More specifically, if a user who approaches the image processing apparatus 101 is to be detected, a user detection mode is executed within a predetermined area 902 including the image processing apparatus 101 in the video 901 based on a list table transmitted from the image processing apparatus 101.

If a user who approaches the image processing apparatus 701 is also to be detected simultaneously therewith, a user detection mode is executed within a predetermined area 903 including the image processing apparatus 701 in the video 901 based on a list table transmitted from the image processing apparatus 701.

Simultaneously, in an entire area in the video 901, a user tracking mode is executed, and persons serving as the users 904 and 905 are specified based on the transmitted list table.

On the other hand, if the camera 703 can only execute one of a plurality of specifying modes within one video, the predetermined specifying mode assigned a high priority among the specifying modes may be executed, or the specifying modes may be sequentially switched in a time series manner.

When the plurality of image processing apparatuses and the plurality of cameras exist, as described above, even if a person cannot be specified in a video captured by one camera, the plurality of cameras 103 and 703 cooperate with each other. Thus, the user can be specified within a wide range.

In a system in which one camera and a plurality of image processing apparatuses are paired, the "specifying mode" 606 is also executed by dividing the video 901 captured by the camera 703 into a plurality of areas within the same space. Thus, the one camera can perform a specifying operation associated with the plurality of image processing apparatuses.

Each of the steps in the present invention can also be implemented by executing software (a program) acquired via a network or various types of storage media in a processing apparatus (a CPU, a processor) such as a personal computer.

The present invention is not limited to the above-mentioned exemplary embodiments. Various modifications (including an organic combination of the exemplary embodiments) can be made based on the scope of the present invention, and are not excluded from the scope of the present invention.

According to the present invention, when information about a user to be captured is collated with feature information about a registered user, collation processing can be efficiently completed by limiting a user candidate to be collated, and collation accuracy can be improved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022027 filed Feb. 7, 2014, which is hereby incorporated by reference herein in its entirety.

What is claimed is:

1. A system including an image forming apparatus that forms an image on paper and an image capturing apparatus that captures a person existing around the image forming apparatus, wherein
the image forming apparatus comprises:
a receiving unit configured to receive a job;
a generation unit configured to generate a list of a plurality of users who have input a job received by the receiving unit; and
a transmission unit configured to transmit the list, which has been generated by the generation unit, to the image capturing apparatus, and
the image capturing apparatus comprises:
an image capturing unit configured to capture a person existing around the image forming apparatus;
a determination unit configured to determine, from among feature information about a plurality of users stored in a database, feature information to be compared with feature information about the person captured by the image capturing unit based on the list that has been transmitted by the transmission unit;
a comparison unit configured to compare the feature information, determined by the determination unit, with the feature information about the person captured by the image capturing unit; and
a notification unit configured to notify the image forming apparatus of a comparison result by the comparison unit; and
the transmission unit transmits status information about the job received by the receiving unit to the image capturing apparatus, and
the image capturing apparatus changes an image capturing mode of the image capturing unit based on the status information transmitted by the transmission unit.

2. The system according to claim 1, wherein the image capturing unit enters a user tracking mode for specifying a user who approaches the image forming apparatus when the receiving unit receives a print job for causing the image forming apparatus to perform printing from an external apparatus.

3. The system according to claim 2, wherein the image capturing apparatus compares, when the user captured by the image capturing unit in the user tracking mode is within a predetermined distance from the image forming apparatus, the feature information about the user specified by the specifying unit and the feature information about the person within the predetermined distance captured by the image capturing unit.

4. The system according to claim 1, wherein the image capturing unit captures, when the receiving unit receives a job via an operation unit configured to receive the input by the user, a face of the user who has input the job.

5. The system according to claim 4, wherein
the specifying unit specifies a user to be compared with the feature information about the person captured by the image capturing unit based on an ID of the user who has input the job, and
the image capturing apparatus compares the feature information about the person specified by the specifying unit with the face of the user captured by the image capturing unit.

6. An image forming apparatus that forms an image on paper and is connected to be communicable with an image capturing apparatus that captures a person existing around the image forming apparatus,
the image forming apparatus comprising:
a receiving unit configured to receive a job;
a generation unit configured to generate a list of a plurality of users who have input a job received by the receiving unit; and
a transmission unit configured to transmit the list, which has been generated by the generation unit, to the image capturing apparatus,
wherein the transmission unit transmits status information about the job received by the receiving unit to the image capturing apparatus, and
the image capturing apparatus changes an image capturing mode of an image capturing unit based on the status information transmitted by the transmission unit.

7. The image forming apparatus according to claim 6, wherein the image capturing unit captures, when the receiving unit receives a job via an operation unit configured to receive the input by the user, a face of the user who has input the job.

8. A method for controlling a system including an image forming apparatus that forms an image on paper and an image capturing apparatus that captures a person existing around the image forming apparatus, the method comprising:
- receiving a job;
- generating a list of a plurality of users who have input a received job;
- transmitting the list to the image capturing apparatus;
- capturing a person existing around the image forming apparatus;
- determining, from among feature information about a plurality of users stored in a database, feature information to be compared with feature information about the captured person based on the list;
- comparing the determined feature information with the feature information about the person captured;
- notifying the image forming apparatus of a comparison result; and
- transmitting status information about the job received to the image capturing apparatus, and
- changing an image capturing mode based on the status information transmitted.

9. An information processing system, comprising:
- a receiving unit configured to receive a job transmitted from an external device;
- an image capturing unit configured to capture a person existing around the information processing system;
- a specifying unit configured to specify, from among plural pieces of pre- stored feature information, feature information that is to be compared with feature information of the person captured by the image capturing unit on the basis of information on the job received by the receiving unit;
- a comparison unit configured to compare the feature information specified by the specifying unit with the feature information of the person captured by the image capturing unit; and
- an execution unit configured to execute the job on the basis of a result of comparison by the comparison unit.

10. The information processing system according to claim 9, further comprising:
- a printing unit configured to print an image on paper,
- wherein the job is a print job for causing the printing unit to print the image.

11. The information processing system according to claim 10, wherein the execution unit executes the print job on the basis of the result of comparison by the comparison unit.

12. The information processing system according to claim 9, wherein the information on the job includes information on a user who inputted the job from the external device to the information processing system.

13. The information processing system according to claim 9, wherein the execution unit executes the job when there is a predetermined degree of similarity found through the comparison by the comparison unit between the feature information specified by the specifying unit and the feature information of the person captured by the image capturing unit.

14. The information processing system according to claim 9, wherein the specifying unit specifies, from among the plural pieces of pre-stored feature information, plural pieces of feature information that are to be compared with the feature information of the person captured by the image capturing unit on the basis of information on a plurality of jobs received by the receiving unit.

15. The information processing system according to claim 9, wherein the specifying unit specifies, from among the plural pieces of pre-stored feature information, plural pieces of feature information that are to be compared with the feature information of the person captured by the image capturing unit on the basis of information on a plurality of jobs selected from among the plurality of jobs received by the receiving unit on the basis of job input time.

16. The information processing system according to claim 14, wherein the comparison unit compares the feature information of the person captured by the image capturing unit with each of the plural pieces of feature information specified by the specifying unit.

17. The information processing system according to claim 9, further comprising:
- a determination unit configured to determine whether the person captured by the image capturing unit has intruded a predetermined area of the information processing system or not,
- wherein the execution unit executes the job on the basis of the result of comparison by the comparison unit and a result of determination by the determination unit.

18. The information processing system according to claim 9, wherein the image capturing unit is a network camera that is connected to the information processing system comprising the execution unit configured to execute the job so as to be able to communicate therewith via a network.

* * * * *